United States Patent
Andersson et al.

(10) Patent No.: US 12,531,851 B2
(45) Date of Patent: Jan. 20, 2026

(54) OFFLINE AUTHENTICATION AND AUTHORIZATION FOR NETWORKED DEVICES

(71) Applicant: Volvo Truck Corporation, Gothenburg (SE)

(72) Inventors: Jonas Andersson, Ängelholm (SE); Anders Hultstein, Västra Frölunda (SE)

(73) Assignee: Volvo Truck Corporation, Gothenburg (SE)

( * ) Notice: Subject to any disclaimer, the term of this patent is extended or adjusted under 35 U.S.C. 154(b) by 295 days.

(21) Appl. No.: 18/025,054

(22) PCT Filed: Nov. 23, 2020

(86) PCT No.: PCT/IB2020/061044
§ 371 (c)(1),
(2) Date: Mar. 7, 2023

(87) PCT Pub. No.: WO2022/106876
PCT Pub. Date: May 27, 2022

(65) Prior Publication Data
US 2023/0336543 A1    Oct. 19, 2023

(51) Int. Cl.
*H04L 29/06* (2006.01)
*H04L 9/40* (2022.01)

(52) U.S. Cl.
CPC .......... *H04L 63/083* (2013.01); *H04L 63/102* (2013.01)

(58) Field of Classification Search
CPC ... H04L 63/083; H04L 63/102; H04L 63/108; H04L 63/0807; H04W 12/043; H04W 12/55; H04W 12/61
See application file for complete search history.

(56) References Cited

U.S. PATENT DOCUMENTS 9,819,672 B1* 11/2017 Machani ............. H04L 63/0853
10,547,622 B2* 1/2020 D ........................ H04L 63/0807
(Continued)

FOREIGN PATENT DOCUMENTS

| EP | 3056032 B1 | 12/2019 |
| FR | 3041798 A1 | 3/2017 |
| WO | 2019127397 A1 | 7/2019 |

OTHER PUBLICATIONS

International Search Report and Written Opinion of the International Searching Authority, PCT/IB2020/061044, mailed Aug. 4, 2021, 11 pages.

*Primary Examiner* — Joseph P Hirl
*Assistant Examiner* — Chi D Nguy
(74) *Attorney, Agent, or Firm* — Sage Patent Group (57) ABSTRACT

A method includes receiving, by a first computing device, a first message from an authorization server over a first network. The first message includes an access token for a computing service, including a permission value defining an access time period, and a refresh token defining a refresh time period. The method further includes storing the access token, the refresh token, and the permission value in a memory of the first computing device. The method further includes receiving, by the first computing device over a second network, a second message including a request for the access token from the second computing device and selectively providing the access token to the second computing device based on the stored access token, the stored refresh token, and the stored permission value.

20 Claims, 5 Drawing Sheets

(56) References Cited

U.S. PATENT DOCUMENTS

| | | |
|---|---|---|
| 2015/0089569 A1 | 3/2015 | Sondhi et al. |
| 2015/0325106 A1 | 11/2015 | Dawes et al. |
| 2015/0350186 A1 | 12/2015 | Chan et al. |
| 2018/0076962 A1 | 3/2018 | Campero et al. |
| 2018/0176079 A1 | 6/2018 | Teo et al. |
| 2020/0160633 A1* | 5/2020 | Zhang .................. B60R 25/102 |
| 2020/0323030 A1 | 10/2020 | Mehta et al. |

\* cited by examiner

OFFLINE AUTHENTICATION AND AUTHORIZATION FOR NETWORKED DEVICES

CROSS REFERENCE TO RELATED APPLICATIONS

This application is a 35 U.S.C. § 371 national stage application of PCT International Application No. PCT/IB2020/061044 filed on Nov. 23, 2020, the disclosure and content of which is incorporated by reference herein in its entirety.

FIELD

Embodiments relate to offline authentication and authorization, and more particularly to offline authentication and authorization for networked computing devices to provide offline access to computing services.

BACKGROUND

Many networked computing devices, including specialized devices such as Internet-of-Things (IoT) devices, are becoming increasingly reliant on networked computing services, which include services that may be stored, executed, and/or authenticated remotely from the networked computing device. In some environments, however, such as construction or industrial sites, for example, network connectivity may be limited, unreliable, or unavailable for extended periods of time. In these environments, computing devices that should be authorized to use computing services may be unable to use necessary computing services due to connectivity issues. Thus, there is a need for providing authentication and authorization services to these devices without requiring constant connectivity to an outside network.

SUMMARY

According to some embodiments, a method includes receiving, by a first computing device, a first message from an authorization server over a first network. The first message includes an access token for a computing service, the access token including a permission value defining an access time period during which a second computing device is authorized to access the computing service, and a refresh token defining a refresh time period in which the first computing device is authorized to provide the access token to the second computing device. The method further includes storing the access token, the refresh token, and the permission value in a memory of the first computing device. The method further includes receiving, by the first computing device over a second network, a second message from the second computing device, the second message including a request for the access token. The method further includes selectively providing, by the first computing device, the access token to the second computing device over the second network based on the stored access token, the stored refresh token, and the stored permission value.

According to some embodiments, a computing device includes a processor circuit and a memory including machine readable instructions. When executed by the processor circuit, the machine readable instructions cause the processor circuit to receive, from an authorization server, a first message over a first network. The first message includes an access token for a computing service, the access token including a permission value defining an access time period during which a second computing device is authorized to access the computing service, and a refresh token defining a refresh time period in which the computing device is authorized to provide the access token to the second computing device. The machine readable instructions further cause the processor circuit to store the access token, the refresh token, and the permission value in the memory. The machine readable instructions further cause the processor circuit to receive, over a second network from the second computing device, a second message including a request for the access token. The machine readable instructions further cause the processor circuit to selectively provide the access token to the second computing device over the second network based on the stored access token, the stored refresh token, and the stored permission value.

According to some embodiments, a system includes a processor circuit and a memory including machine readable instructions. When executed by the processor circuit, the machine readable instructions cause the processor circuit to provide, to a first computing device, a first message over a first network. The first message includes an access token for a computing service, the access token including a permission value defining an access time period during which a second computing device is authorized to access the computing service, and a refresh token defining a refresh time period in which the first computing device is authorized to provide the access token to the second computing device.

Other devices, methods, and systems according to embodiments will be or become apparent to one with skill in the art upon review of the following drawings and detailed description. It is intended that all such additional machines, methods, and control systems be included within this description and protected by the accompanying claims. Moreover, it is intended that all embodiments disclosed herein can be implemented separately or combined in any way and/or combination.

Aspects

According to an aspect, a method includes receiving, by a first computing device, a first message from an authorization server over a first network. The first message includes an access token for a computing service, the access token including a permission value defining an access time period during which a second computing device is authorized to access the computing service, and a refresh token defining a refresh time period in which the first computing device is authorized to provide the access token to the second computing device. The method further includes storing the access token, the refresh token, and the permission value in a memory of the first computing device. The method further includes receiving, by the first computing device over a second network, a second message from the second computing device, the second message including a request for the access token. The method further includes selectively providing, by the first computing device, the access token to the second computing device over the second network based on the stored access token, the stored refresh token, and the stored permission value.

According to another aspect, selectively providing the access token to the second computing device further includes determining, based on a current time and the refresh token, whether the first computing device is authorized to provide the access token to the second computing device.

According to another aspect, the method further includes providing the access token to the second computing device only in response to determining that the first computing device is authorized to provide the access token to the second computing device.

According to another aspect, the first computing device is a first component of a vehicle, and second computing device is a second component of the vehicle.

According to another aspect, the first computing device and the second computing device are configured to communicate with each other using the second network.

According to another aspect, the second network includes a WiFi network.

According to another aspect, the first network includes a cellular data network.

According to another aspect, the access time period is shorter than the refresh time period.

According to another aspect, a computing device includes a processor circuit and a memory including machine readable instructions. When executed by the processor circuit, the machine readable instructions cause the processor circuit to receive, from an authorization server, a first message over a first network. The first message includes an access token for a computing service, the access token including a permission value defining an access time period during which a second computing device is authorized to access the computing service, and a refresh token defining a refresh time period in which the computing device is authorized to provide the access token to the second computing device. The machine readable instructions further cause the processor circuit to store the access token, the refresh token, and the permission value in the memory. The machine readable instructions further cause the processor circuit to receive, over a second network from the second computing device, a second message including a request for the access token. The machine readable instructions further cause the processor circuit to selectively provide the access token to the second computing device over the second network based on the stored access token, the stored refresh token, and the stored permission value.

According to another aspect, the machine readable instructions that selectively provide the access token to the second computing device further cause the processor circuit to determine, based on a current time and the refresh token, whether the computing device is authorized to provide the access token to the second computing device.

According to another aspect, the machine readable instructions further cause the processor circuit to provide the access token to the second computing device only in response to determining that the computing device is authorized to provide the access token to the second computing device.

According to another aspect, the computing device further includes a first component of a vehicle including the processor circuit and the memory, wherein the second computing device is a second component of the vehicle.

According to another aspect, the computing device is configured to communicate with the second computing device using the second network.

According to another aspect, the second network includes a WiFi network.

According to another aspect, the first network includes a cellular data network.

According to another aspect, the access time period is shorter than the refresh time period.

According to another aspect, a system includes a processor circuit and a memory including machine readable instructions. When executed by the processor circuit, the machine readable instructions cause the processor circuit to provide, to a first computing device, a first message over a first network. The first message includes an access token for a computing service, the access token including a permission value defining an access time period during which the a second computing device is authorized to access the computing service, and a refresh token defining a refresh time period in which the first computing device is authorized to provide the access token to the second computing device.

According to another aspect, the first computing device includes a component of a vehicle.

BRIEF DESCRIPTION OF THE DRAWINGS

The accompanying drawings, which are included to provide a further understanding of the disclosure and are incorporated in and constitute a part of this application, illustrate certain non-limiting embodiments of inventive concepts. In the drawings.

DETAILED DESCRIPTION OF EMBODIMENTS

Embodiments provide for delegating authorization operations from a centralized management system, such as a remotely-located backend or authorization server, to a local computing device, such as an internet-enabled computing device, e.g., an Internet-of-Things (IoT) device. These operations may allow the local computing device to provide offline authentication and authorization to other computing devices, such as other systems of the local computing device or other computing devices connected to the local computing device through a local network, without the need for constant connectivity to the remote authorization server over a wider-area network.

Figure 1:
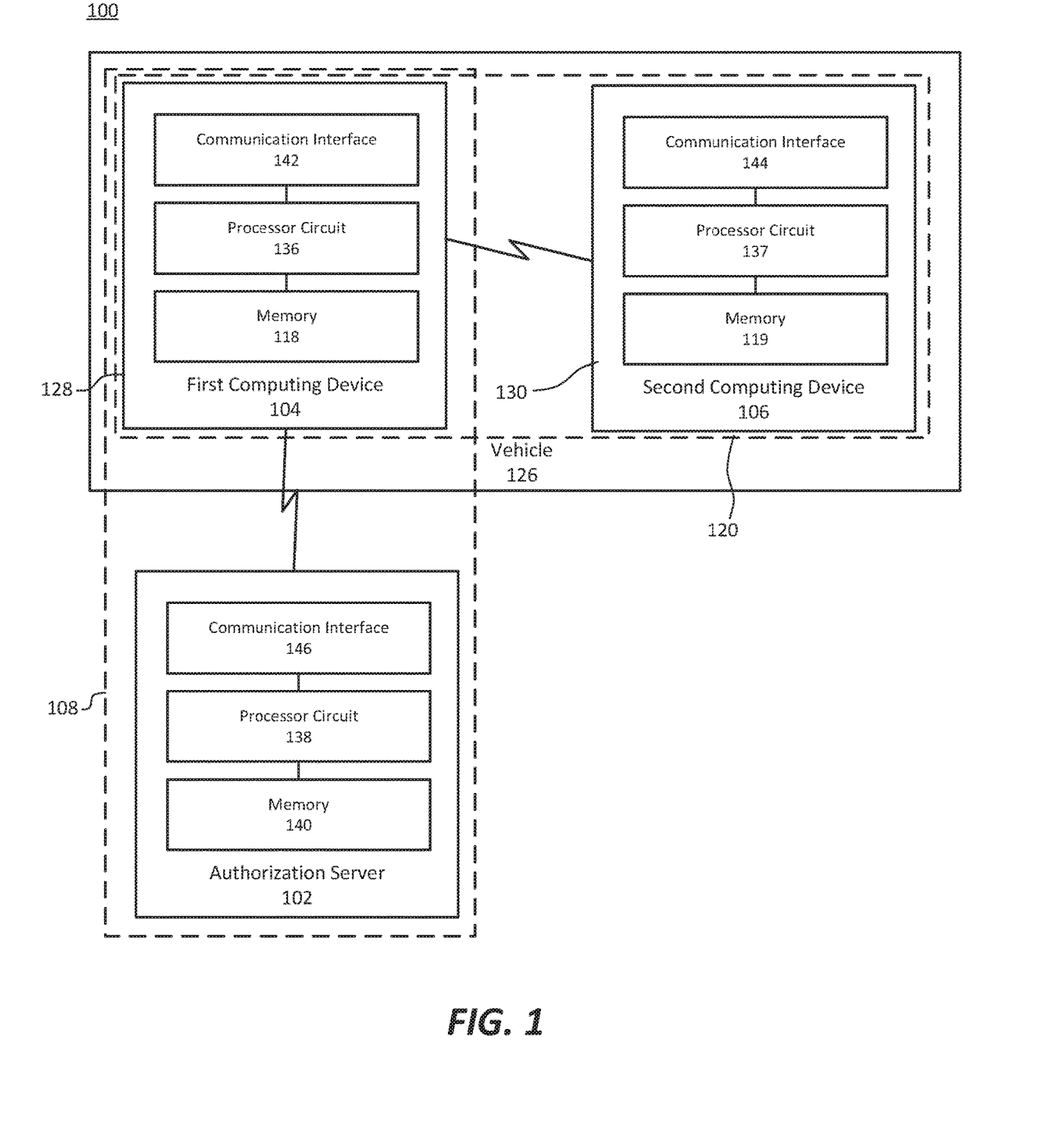
FIG. 1 is a diagram of a system that includes a vehicle having a first computing device for providing access to a computing service to a second computing device of the vehicle, according to some embodiments.

In this regard, FIG. 1 illustrates a system 100 that includes an authorization server 102 connected to a first computing device 104 over a first network 108. In this example, the first computing device 104 is a component 128 of a vehicle 126, but it should be understood that other systems or devices may be used with embodiments of the disclosure, such as stationary or movable industrial or construction equipment or other systems or devices for which reliable access to a wider-area network may not always be available. The vehicle 126 also includes another component 130 that includes a second computing device 106 connected to the first computing device 104 over a second network 120. The second computing device 106 may also be capable of connection to the authorization server 102 over the first network 108, as desired.

As used herein, the term network (e.g., first network 108, second network 120) may refer to wired or wireless communication connections between different computing devices (e.g., first computing device 104, second computing device 106, authorization server 102). In this example, the first network 108 is a cellular data network, but it should be understood that other wired or wireless networks may be used to facilitate communication between the authorization server 102 and the first computing device 104. The second network 120 in this example is a wired connection between the components 128, 130 of the vehicle 126, but it should be understood that other wired or wireless networks, such as WiFi or Bluetooth networks for example, may be used to facilitate communication between the first computing device 104 and the second computing device 106. In some embodiments, the first computing device 104 and second computing device 106 may include hardware and/or software modules of a single computing system for the vehicle 126 or other system.

In this example, the first computing device 104 includes a processor circuit 136 and a memory 118. The second computing device 106 may also include a processor circuit 137 and a memory 119, or may use the processor circuit 136 and/or memory 118 of the first computing device for some or all of its functionality, as desired. The authorization server 102 also includes a processor circuit 138 and a memory 140. In this example, the first computing device includes one or more communication interfaces 142 that facilitate communication with a corresponding communication interface 146 of the authorization server 102 over the first network 108 and/or communication with a corresponding communication interface 144 of the second computing device over the second network 120.

Figure 2:
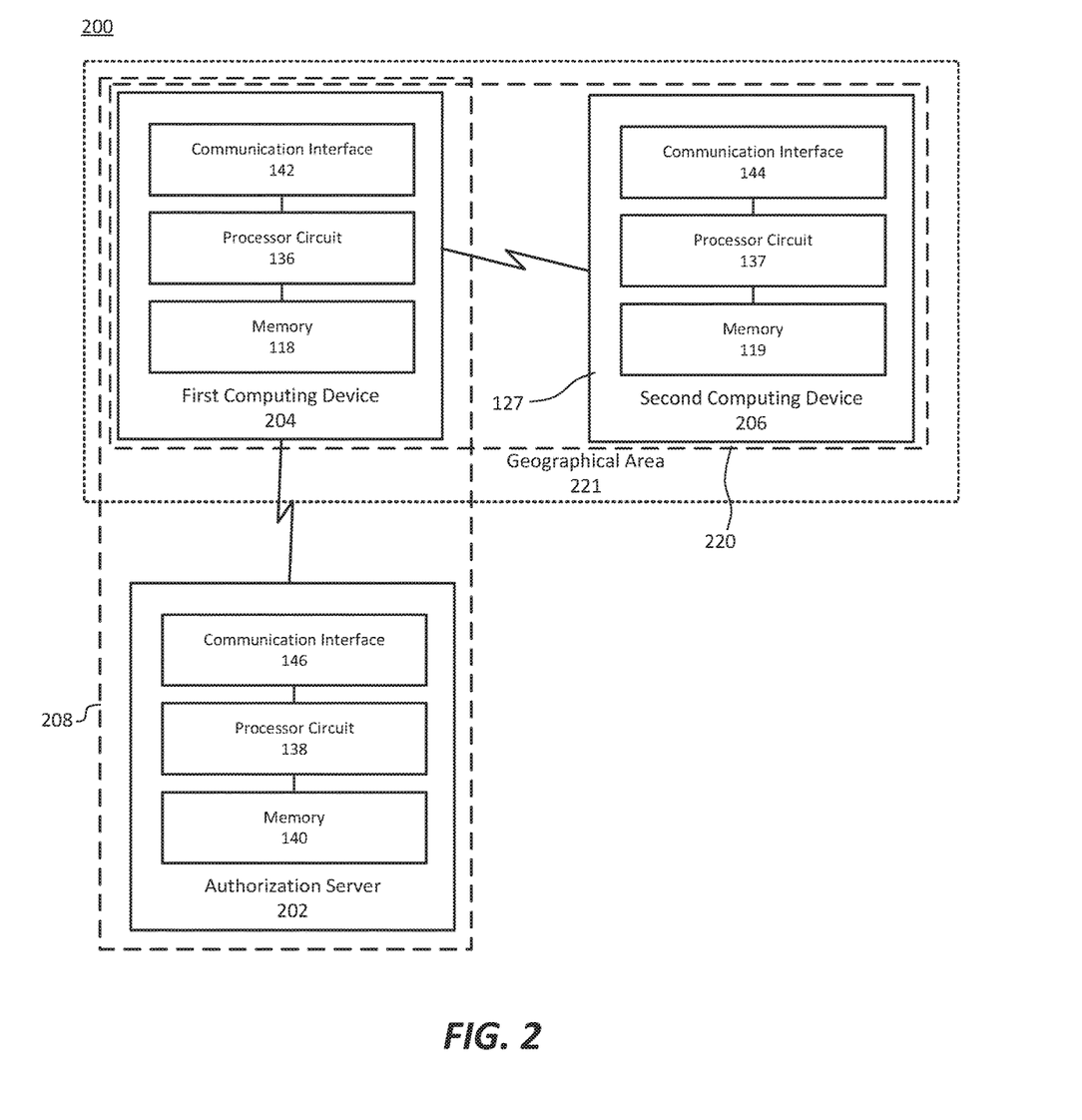
FIG. 2 is a diagram of another system that includes a first computing device for providing access to a computing service to a second computing device in a local network, according to some embodiments.

In this regard, FIG. 2 illustrates another system 200 having multiple computing devices 204, 206 connected by a local wireless network 220 (e.g., WiFi) that covers a limited geographical area 221, e.g., a construction or industrial site. A first computing device 204 is connected to an authorization server 202 by a wider-area network 208 (e.g., cellular data network, satellite communication network) and receives periodic authorization from the authorization server 202 to provide access and authorization for a network-connected service for the second computing device 206 or other computing devices connected by the local wireless network 220. In this example, the first computing device 204 may be a local authorization device, e.g., a stationary or portable server device, and the second computing device 206 may be a vehicle 127 or other device that is mobile within the local wireless network 220.

Figure 3A:
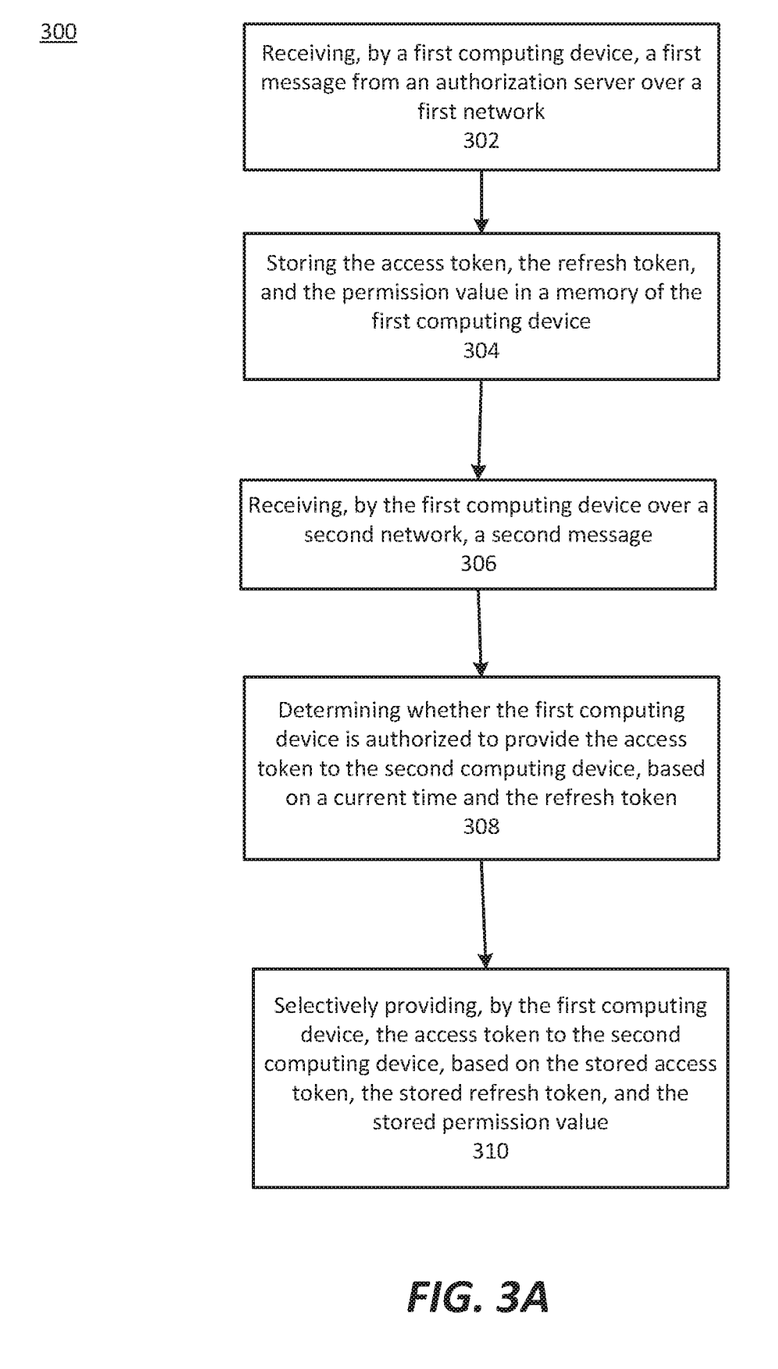
FIGS. 3A-3B are flowchart diagrams of operations for a method of providing offline access to a computing service, according to some embodiments.
Figure 3B:
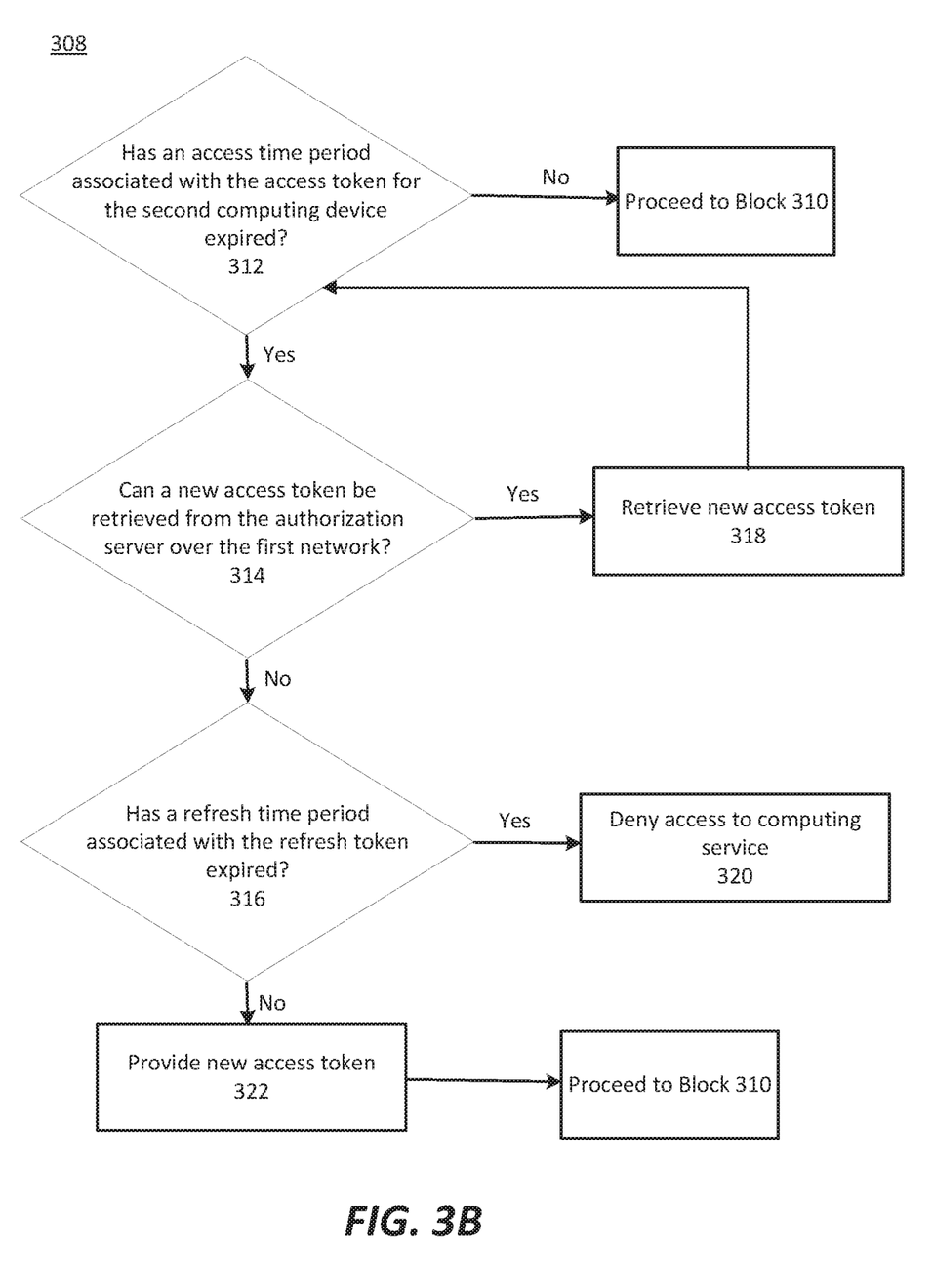

FIGS. 3A and 3B are flowchart diagrams of operations 300 for a method of providing offline access to a computing service according to some embodiments. Referring now to FIG. 3A, the operations 300 include receiving, by a first computing device, a first message from an authorization server over a first network (Block 302). The first computing device may include the first computing device 104 of FIG. 1 or the first computing device 204 of FIG. 2, for example. As will be discussed in greater detail below with respect to FIG. 4, the first message may include an access token for a computing service and a refresh token. The access token may include a permission value that defines an access time period during which a second computing device, such as the second computing device 106 of FIG. 1 or the second computing device 206 of FIG. 2 for example, is authorized to access the computing service. In the context of the present disclosure, a "token" refers to a digital key, signature, hash, number, or other value or set of values that can be communicated to/from and/or stored by a computing device and that represents a permission, authorization, quality or feature associated with the computing device.

The operations 300 further include storing the access token, the refresh token, and the permission value in a memory of the first computing device (Block 304). The operations 300 further include receiving, by the first computing device over a second network, a second message (Block 306) from the second computing device. As will be discussed in greater detail below with respect to FIG. 4, the message may include a request for the access token from the second computing device.

The operations may further include determining whether the first computing device is authorized to provide the access token to the second computing device, based on a current time and the refresh token (Block 308). The operations 300 further include selectively providing, by the first computing device, the access token to the second computing device, based on the stored access token, the stored refresh token, and the stored permission value (Block 310). The access token may be provided over the second network, e.g., the wired or wireless communication connections between the first and second computing devices.

Referring now to FIG. 3B, in some embodiments, the determining operation (Block 308) may include first determining whether an access time period associated with the access token for the second computing device has expired (Block 312). If the access token has not expired, the operations proceed to Block 310, and the computing service may be provided in accordance with the permission value. If the access token has expired, the determining operation next determines whether a new access token can be retrieved from the authorization server over the first network (Block 314). If so, a new access token is retrieved (Block 318) and the process returns to Block 312 and/or proceeds to Block 310, and the computing service may be provided in accordance with the permission value.

If a new access token cannot be retrieved, e.g., because the first computing device is offline or the second network is unavailable or unreliable, the determining operation next determines whether a refresh time period associated with the refresh token has expired (Block 316). If the refresh time period has expired, the first computing device denies access to the computing service by the second computing device (Block 320). If the refresh token has not expired, the first computing device provides a new access token with a new access time period to the second computing device (Block 322) and/or proceeds to Block 310.

In this example, an access time period associated with the access token is shorter than a refresh time period associated with the refresh token. This allows the first computing device to serve as a gatekeeper for providing access to the computing service even while the first computing device is offline or otherwise unable to access the authorization server. The access time period for each access token can remain relatively short, so that the second computing device still needs to obtain authorization from the first computing device to continue using the computing service.

By way of a non-limiting example, it might be desirable to require the second computing device to re-authenticate every hour to continue using the computing service. However, the system might only have access to the first network for a limited time each day, preventing the authorization server from reauthorizing the second computing device directly. For example, a remotely located construction site might only have satellite network connectivity for a short time each day while the satellite is within an unobstructed line of sight of the construction site. In this example, the first computing device would receive the access token(s), permission value(s) from the authorization server during its daily period of connectivity and obtain a refresh token providing the first computing device with authorization to provide and/or generate access tokens for use by the second computing device. In this example, the refresh time period may be one day, so that the first computing device can obtain a new refresh token before the expiration of the current refresh token during the next period of connectivity. If the refresh token is allowed to expire without obtaining a new refresh token, however, the first computing device would not be authorized to provide a new access token to the second computing device until connectivity is restored. In this example, the access token is provided to the second computing device only in response to determining that the first computing device is authorized to provide the access token to the second computing device, e.g., by determining that the refresh token has not expired and that the refresh token authorizes the first computing device to provide the access token to the second computing device.

Figure 4:
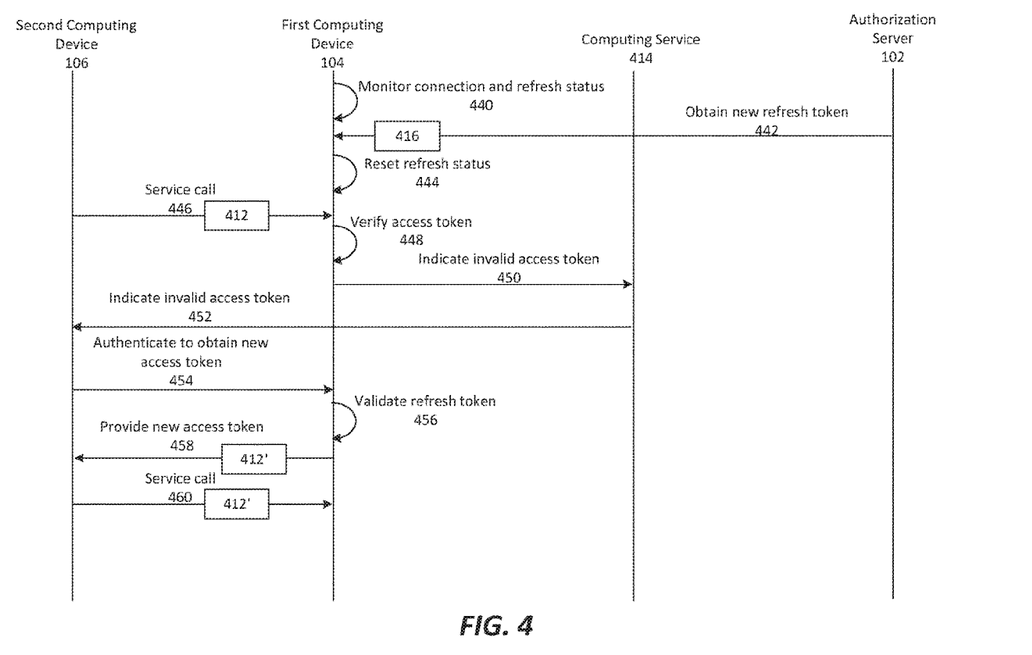
FIG. 4 is a communication diagram illustrating operations of a process for providing access to a computing service, according to some embodiments.

Referring now to FIG. 4, a communication diagram illustrating communication between the authorization server 102, the first computing device 104, and the second computing device 106 is illustrated, according to an embodiment.

In this example, the first computing device 104 monitors a connection and refresh status 440 for the refresh token. When the first computing device 104 is online and in a refresh state, the first computing device 104 periodically obtains 442 a new refresh token 416 and resets its refresh status 444. The second computing device 106 makes a service call 446, including a current access token 412 (e.g., a JSON web token (JWT), using a JSON Web Signature (JWS) for example, to the computing service 414 requesting access to the computing service 414. The computing service attempts to verify 448 the access token 412 with the first computing device 104. If the first computing device sends an indication 450 that the access token 412 is invalid, the computing service 414 then sends an indication 452 to the second computing device 106 that the access token 412 is invalid.

In response to the invalid token indication 452, the second computing device 106 attempts to authenticate 454 with the first computing device 104 to obtain a new access token 412. The first computing device 104 then validates 456 the refresh token 416 without the need to access the authorization server 102. If the refresh token 416 is valid, the first computing device provides 458 a new access token 412' to the second computing device 106. The second computing device can then use the new access token 412' to make a new service call 460 to access the computing service 414.

In some examples, a backend service management system is configured to delegate the authority handling to a network connected device, such as an IoT device. The backend service management system may use role-based access control to provide delegation, following an open authorization protocol standard e.g. OAUTH, for example, for the access delegation. In some examples, the backend service management system and the IoT device include the same software components relating to manage secured access control for the computing service, with a proxy pattern used to control and manage access within the IoT device, e.g., by operating as a proxy and cache for the backend service management system without requiring constant connectivity thereto.

When an element is referred to as being "connected", "coupled", "responsive", "mounted", or variants thereof to another element, it can be directly connected, coupled, responsive, or mounted to the other element or intervening elements may be present. In contrast, when an element is referred to as being "directly connected", "directly coupled", "directly responsive", "directly mounted" or variants thereof to another element, there are no intervening elements present. Like numbers refer to like elements throughout. As used herein, the singular forms "a", "an" and "the" are intended to include the plural forms as well, unless the context clearly indicates otherwise. Well-known functions or constructions may not be described in detail for brevity and/or clarity. The term "and/or" and its abbreviation "/" include any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus, a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but do not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated, and/or blocks/operations may be omitted without departing from the scope of inventive concepts. Moreover, although some of the diagrams include arrows on communication paths to show a primary direction of communication, it is to be understood that communication may occur in the opposite direction to the depicted arrows.

Persons skilled in the art will recognize that certain elements of the above-described embodiments may variously be combined or eliminated to create further embodiments, and such further embodiments fall within the scope and teachings of inventive concepts. It will also be apparent to those of ordinary skill in the art that the above-described embodiments may be combined in whole or in part to create additional embodiments within the scope and teachings of inventive concepts. Thus, although specific embodiments of, and examples for, inventive concepts are described herein for illustrative purposes, various equivalent modifications are possible within the scope of inventive concepts, as those skilled in the relevant art will recognize. Accordingly, the scope of inventive concepts is determined from the appended claims and equivalents thereof.

The invention claimed is:

1. A method comprising:
   receiving, by a first computing device, a first message from an authorization server over a first network, the first message comprising:
   an access token for a computing service, the access token comprising a permission value defining an access time period during which a second computing device is authorized to access the computing service; and
   a refresh token defining a refresh time period in which the first computing device is authorized to generate and/or provide access tokens to the second computing device, wherein during the refresh period, when the access token is no longer valid, the first computing device is authorized to generate and provide a new access token to the second computing device without communicating with the authorization server;
   storing the access token, the refresh token, and the permission value in a memory of the first computing device;
   receiving, by the first computing device over a second network, a second message from the second computing device, the second message comprising a request for a valid access token; and
   selectively providing, by the first computing device, the access token or the new access token to the second computing device over the second network based on the stored access token, the stored refresh token, and the stored permission value.

2. The method of claim 1, wherein selectively providing the access token to the second computing device further comprises determining, based on a current time and the refresh token, whether the first computing device is authorized to provide the access token to the second computing device.

3. The method of claim 2, further comprising providing the access token to the second computing device only in response to determining that the first computing device is authorized to provide the access token to the second computing device.

4. The method of claim 1, wherein the first computing device is a first component of a vehicle, and
   wherein the second computing device is a second component of the vehicle.

5. The method of claim 1, wherein the first computing device and the second computing device are configured to communicate with each other using the second network.

6. The method of claim 5, wherein the second network comprises a WiFi network.

7. The method of claim 6, wherein the first network comprises a cellular data network.

8. The method of claim 1, wherein the first network comprises a cellular data network.

9. The method of claim 1, wherein the access time period is shorter than the refresh time period.

10. A computing device comprising:
    a processor circuit; and
    a memory comprising machine readable instructions that, when executed by the processor circuit, cause the processor circuit to:
    receive, from an authorization server, a first message over a first network, the first message comprising:
    an access token for a computing service, the access token comprising a permission value defining an access time period during which a second computing device is authorized to access the computing service; and
    a refresh token defining a refresh time period in which the computing device is authorized to generate and/or provide access tokens to the second computing device, wherein during the refresh period, when the access token is no longer valid, the first computing device is authorized to generate and provide a new access token to the second computing device without communicating with the authorization server;
    store the access token, the refresh token, and the permission value in the memory;
    receive, over a second network from the second computing device, a second message comprising a request for a valid access token; and
    selectively provide the access token or the new access token to the second computing device over the second network based on the stored access token, the stored refresh token, and the stored permission value.

11. The computing device of claim 10, wherein the machine readable instructions that selectively provide the access token to the second computing device further cause the processor circuit to determine, based on a current time and the refresh token, whether the computing device is authorized to provide the access token to the second computing device.

12. The computing device of claim 11, wherein the machine readable instructions further cause the processor circuit to provide the access token to the second computing device only in response to determining that the computing device is authorized to provide the access token to the second computing device.

13. The computing device of claim 10, further comprising a first component of a vehicle comprising the processor circuit and the memory, wherein the second computing device is a second component of the vehicle.

14. The computing device of claim 10, wherein the computing device is configured to communicate with the second computing device using the second network.

15. The computing device of claim 14, wherein the second network comprises a WiFi network.

16. The computing device of claim 15, wherein the first network comprises a cellular data network.

17. The computing device of claim 10, wherein the first network comprises a cellular data network.

18. The computing device of claim 10, wherein the access time period is shorter than the refresh time period.

19. A system comprising:
a processor circuit; and
a memory comprising machine readable instructions that, when executed by the processor circuit, cause the processor circuit to:
provide, to a first computing device, a first message over a first network, the first message comprising:
an access token for a computing service, the access token comprising a permission value defining an access time period during which a second computing device is authorized to access the computing service; and
a refresh token defining a refresh time period in which the first computing device is authorized to generate and/or provide access tokens to the second computing device, wherein during the refresh period, when the access token is no longer valid, the first computing device is authorized to generate and provide a new access token to the second computing device without communicating with the authorization server.

20. The system of claim 19, wherein the first computing device comprises a component of a vehicle.

* * * * *